May 16, 1939.  M. F. SWANSON  2,158,596
TRUCKING VEHICLE
Filed Feb. 16, 1938   2 Sheets-Sheet 1

Inventor
Meryl F. Swanson,
By J. Stanley Burch
Attorney

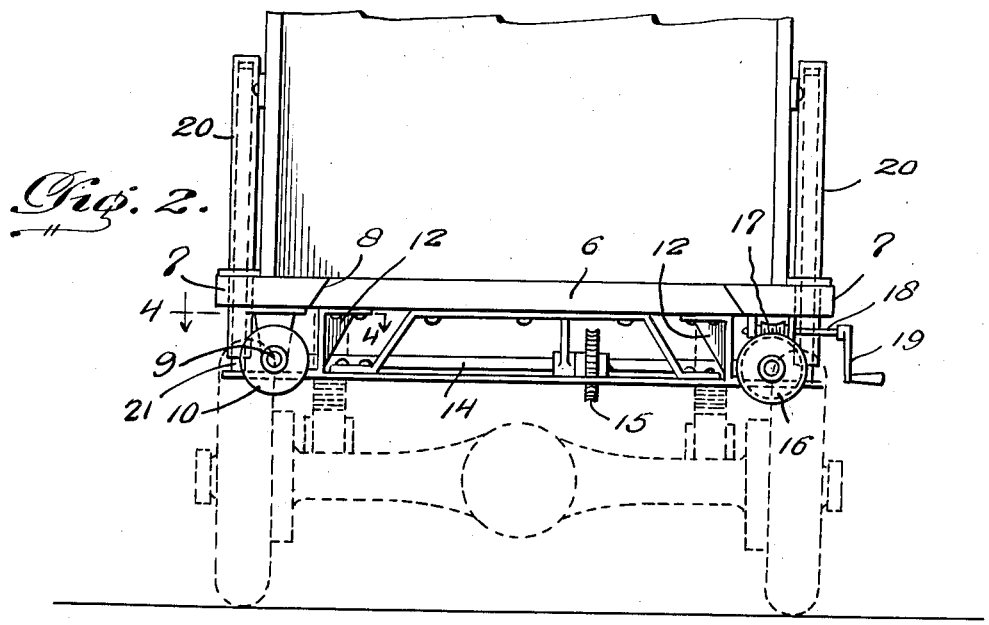
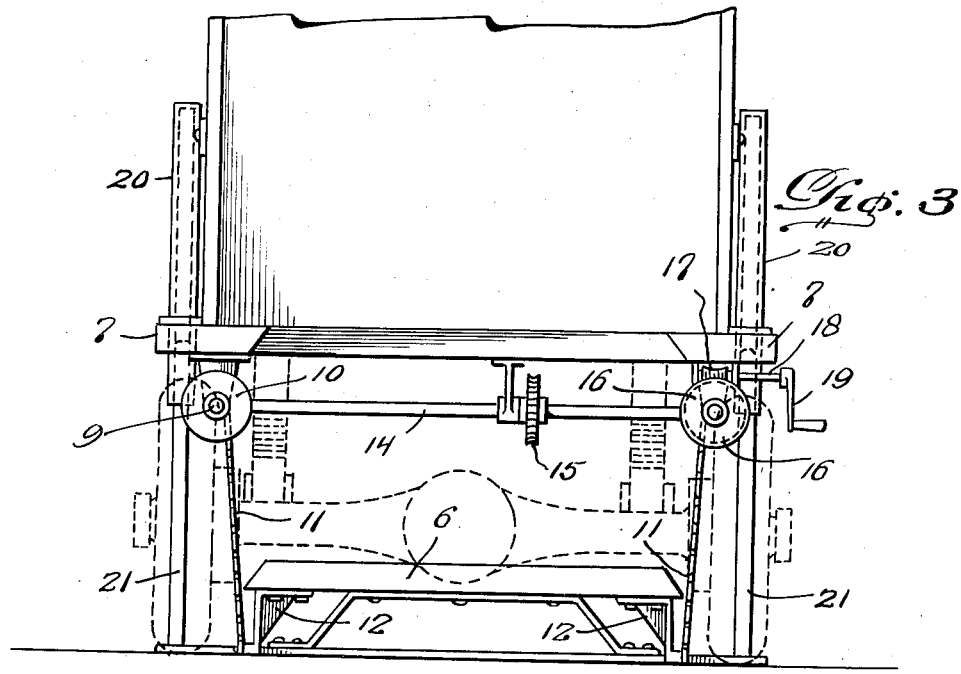

Patented May 16, 1939

2,158,596

UNITED STATES PATENT OFFICE 2,158,596

TRUCKING VEHICLE

Meryl F. Swanson, Galva, Ill.

Application February 16, 1938, Serial No. 190,849

4 Claims. (Cl. 214—75)

This invention relates to a trucking vehicle having an elevator by means of which heavy objects may be readily placed on and removed from the vehicle with comparatively little manual labor.

The primary object of the present invention is to provide a trucking vehicle of the above kind having the elevator incorporated in its construction so as to insure compactness, durability, and easy and efficient operation of the elevator.

Other objects and advantages of the present invention will become apparent from the following description when considered in connection with the accompanying drawings, in which:

Figure 2 is a rear elevational view thereof.

Figure 3 is a view similar to Figure 2 with the elevator platform lowered.

Referring in detail to the drawings, the present trucking vehicle has a floor 5 provided at its rear end with a vertically movable section 6 constituting an elevator platform and disposed between relatively narrow rearwardly projecting fixed side floor portions 7. The meeting edges of the fixed floor portions and the movable floor section 6 are preferably beveled outwardly and downwardly as indicated at 8 so as to limit the upward movement of the movable floor section 6 to a position wherein the upper surface of the latter is flush with the upper surfaces of the fixed floor portions, whereby there will be no ledges to interfere with the free movement of heavy objects forwardly off of or rearwardly onto the vertically movable floor section 6 in the loading or unloading operation.

Figure 1:
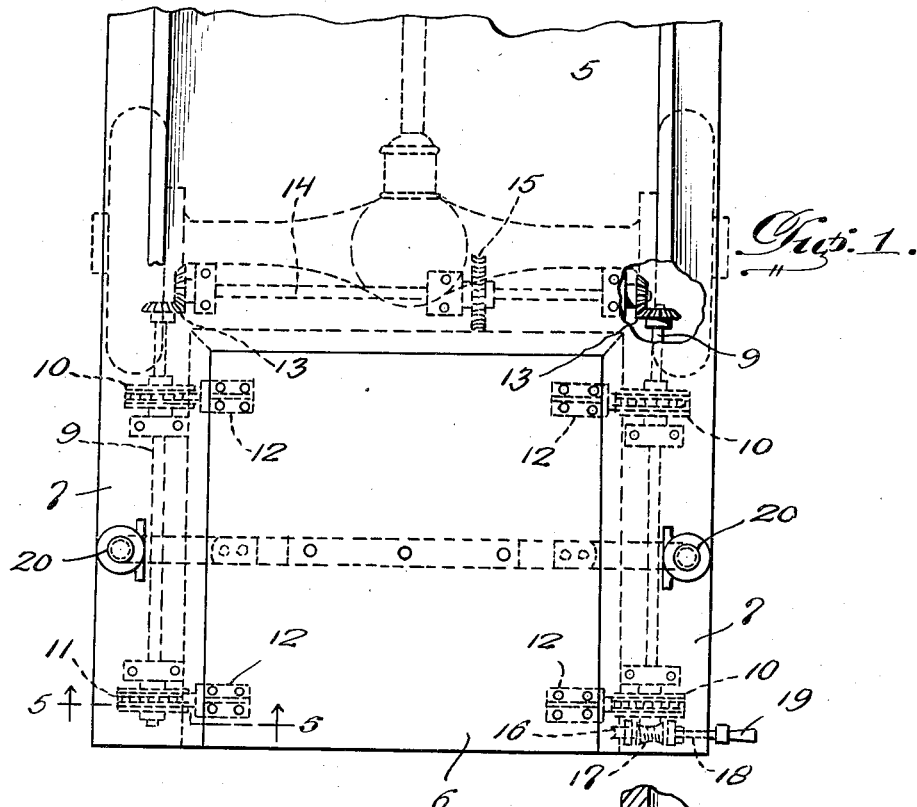
Figure 1 is a fragmentary top plan view, showing the rear end portion of a trucking vehicle equipped with an elevator in accordance with the present invention.
Figures 4, 5:
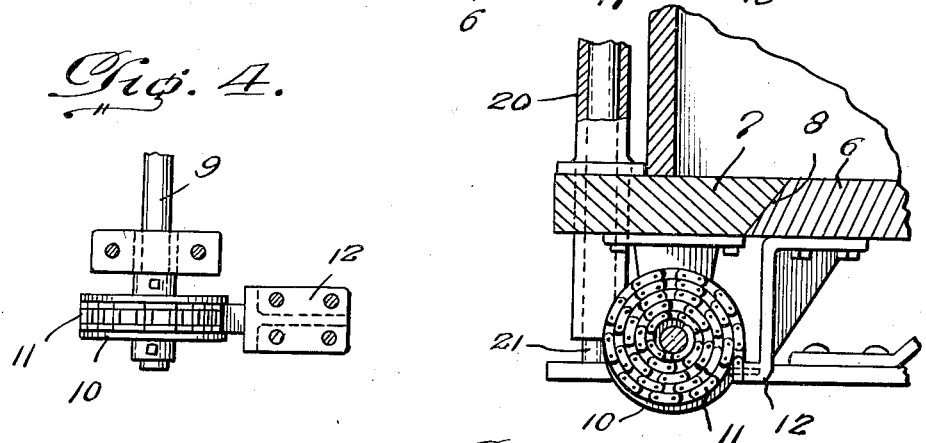
Figure 4 is a fragmentary sectional view taken on the plane of line 4—4 of Figure 2.
Figure 5 is a similar view taken on line 5—5 of Figure 1.

Journaled on the underside of the fixed rearwardly projecting side floor portions 7, at opposite sides of the movable floor section 6, are longitudinal shafts 9, each provided at points adjacent the forward and rear ends of the floor section 6 with drums 10. Attached to and wound upon each of the drums 10 is a chain or similar flexible member 11 whose outer end is attached to a bracket 12 secured to the underside of the floor section or elevator platform 6. A chain or flexible member 11 is thus connected to the movable floor section or platform 6 adjacent each corner of the latter and extended directly to the adjacent drum 10 of the adjacent shaft 9. Obviously, by rotating shafts 9 in the proper direction, the chains or flexible members 11 may be simultaneously wound on the drums 10 so as to elevate the floor section or platform 6 to its normal raised position of Figures 1 and 2, the lifting power being uniformly applied at each of the four corners of the platform so as to insure ease of operation and the expenditure of a minimum amount of power. The shafts 9 extend forwardly slightly beyond the forward end of movable floor section or platform 6 where they are geared as at 13 to the adjacent ends of a transverse shaft 14 journaled on the underside of the fixed forward floor portion of the truck directly in front of the forward end of the movable floor section 6. In this way, the shafts 9 are intergeared so that they are operated simultaneously for either winding the chains or flexible members 11 onto the drums 10 to elevate the platform 6 or to unwind the chains or flexible members 11 from the drums 10 and lower the movable floor section or platform 6. In use, it will be seen that a heavy object may be readily moved rearwardly from the forward fixed floor portion of the truck onto the movable floor section or platform 6 when the latter is in its raised position of Figures 1 and 2, whereupon the floor section or platform 6 and the heavy object placed thereon may be readily lowered to the position of Figure 3 in close proximity to the ground where the heavy object may be conveniently removed from the platform 6 without the exercise of skill, the use of special equipment, or the exercise of a great amount of manual labor. Similarly, a heavy object may be readily placed on the platform 6 when lowered, whereupon the object may be readily raised with the platform 6 until it is flush with the fixed floor portions of the trucking vehicle, the object being conveniently moved forward onto the forward fixed floor portion of the trucking vehicle after the movable floor section or platform 6 reaches the raised position of Figures 1 and 2.

The shafts 9 may be driven in any suitable or preferred way and by any suitable or preferred means. For instance, the transverse shaft 14 may have a gear 15 which may be driven from the power plant of the trucking vehicle, or manually operable means may be provided at the rear end of one of the shafts 9 including a worm gear 16 fixed on said shaft 9 and driven by a worm 17 carried by a transverse shaft 18 having an operating handle 19.

In order to prevent forward or rearward, or lateral swaying of the platform 6 when being raised or lowered, guiding means is preferably provided therefor including telescoping members 20 and 21 respectively carried by the fixed side floor portions 7 and attached to the movable floor section or platform 6 at the sides of the latter. These guides may be of any suitable or preferred construction, and are merely illustrated by way of example as consisting of rods 21 attached to the platform 6 at opposite sides of the latter and projecting upwardly therefrom and slidably extending into cylinders 20 mounted upon the side fixed floor portions 7.

From the foregoing description, it is believed that the construction and operation, as well as the advantages of the present invention will be readily understood and appreciated by those skilled in the art. The construction is embodied directly in the body of the truck, as distinguished from an attachment to the rear end of the latter. The construction is simple, durable and compact, and affords an elevator which is efficient and easy to operate so as to reduce the labor to load and unload the truck to a minimum. Minor changes in the details of construction illustrated and described are contemplated within the spirit and scope of the invention as claimed.

What I claim as new is:

1. In combination, a vehicle body floor provided at its rear end with a vertically movable section constituting an elevator platform and having fixed portions projecting rearwardly at opposite sides of said vertically movable section, and means including longitudinal drum-carrying shafts journaled on the under sides of and supported by said fixed floor portions and operatively connected to opposite sides of said vertically movable floor section for raising and lowering the latter.

2. In combination, a vehicle body floor provided at its rear end with a vertically movable section constituting an elevator platform and having fixed portions projecting rearwardly at opposite sides of said vertically movable section, and means including longitudinal drum-carrying shafts journaled on the under sides of and supported by said fixed floor portions and operatively conected to opposite sides of said vertically movable floor section for raising and lowering the latter, the edges of said vertically movable section and the fixed portions of said floor being beveled outwardly and downwardly to limit the upward movement of the movable floor section to a position wherein the upper surface thereof is flush with the upper surface of the rest of the floor.

3. In combination, a vehicle body floor provided at its rear end with a vertically movable section constituting an elevator platform and having fixed portions projecting rearwardly at opposite sides of said vertically movable section, means including longitudinal drum-carrying shafts journaled on the under sides of and supported by said fixed floor portions and operatively connected to opposite sides of said vertically movable floor section for raising and lowering the latter, said last-named means comprising a transverse driven shaft journaled beneath said floor forwardly of said vertically movable section and geared to said longitudinal shafts, and flexible hoisting elements connected to the drums of said longitudinal shafts and to said vertically movable floor section.

4. In combination, a vehicle body floor provided at its rear end with a vertically movable section constituting an elevator platform and having fixed portions projecting rearwardly at opposite sides of said vertically movable section, means supported by said fixed portions and operatively connected to opposite sides of said vertically movable section for raising and lowering the latter, said last-named means comprising longitudinal operating shafts journaled beneath said fixed floor portions and flexible hoisting elements operated by said shafts and connected to said vertically movable floor section, means operatively connecting said longitudinal shafts for simultaneously driving the same in opposite directions, guiding means for preventing longitudinal or lateral swaying of said vertically movable floor section while being raised or lowered, said last-named means comprising guides composed of telescoping members respectively carried by the fixed floor portions and said vertically movable floor section.

MERYL F. SWANSON.